United States Patent [19]
Ravani et al.

[11] Patent Number: 5,979,581
[45] Date of Patent: Nov. 9, 1999

[54] LATERAL VEHICLE CONTROL APPARATUS AND METHOD FOR AUTOMATED HIGHWAY SYSTEMS AND INTELLIGENT CRUISE CONTROL

[75] Inventors: Bahram Ravani, Davis; Ty A. Lasky, Santa Rosa, both of Calif.

[73] Assignee: The Regents of the University of California, Oakland, Calif.

[21] Appl. No.: 08/745,121

[22] Filed: Nov. 7, 1996

[51] Int. Cl.$^6$ ........................................................ B60T 7/16
[52] U.S. Cl. ............................................................ 180/168
[58] Field of Search ............................. 180/168; 318/580, 318/587; 364/424; 404/84.05, 84.2, 84.5, 84.8

[56] References Cited

U.S. PATENT DOCUMENTS

| | | | |
|---|---|---|---|
| 5,318,143 | 6/1994 | Parker et al. | 180/168 |
| 5,698,256 | 12/1997 | Collinucci | 180/168 X |
| 5,708,427 | 1/1998 | Bush | 180/168 X |
| 5,765,116 | 6/1998 | Wilson-Jones et al. | 180/168 X |

OTHER PUBLICATIONS

J. Rennilson and J. Yu, "Automated Paint Restriping Recognition and Guidance System: Phase I Final Report," Advanced Retro Technology, Inc., Technical Report UCD–ARR–91–11–01–01, AHMCT, University of California, Davis, Nov. 1991.

T. A. Lasky and B. Ravani, Robust Lateral Vehicle Control Using Quanitative Feedback Theory (QFT), Proceedings of the Third World Congress on Intelligent Transportation Systems (ITS), Orlando, Florida, Oct. 1996.

Shladover, S. et al., "Automatic Vehicle Control Developments in the Path Program", IEEE Transactions on Vehicular Technology, vol. 40., No. 1, pp. 114–130, Feb. 1991.

Tsumura et al., "Proposed Position and Heading Measurement System of Automobile on Freeway Using Laser Beams", Society of Automotice Engineers, Vehicle/Highway Automation: Technology and Policy Issues, pp. 19–25, 1989.

Chang, S., "A Laser–Controlled Automated Vehicle Operation System", Proceedings of the Second World Congress on Intellgent Transport Systems, Yokohama, Japan, pp. 1023–1028, Nov. 8, 1995.

Rebora et al., "Road Recognition Method for Anticollisioin Radar System", Proceedings of the Second World Congress on Intellgent Transport Systems, Yokohama, Japan, pp. 1057–1062, Nov. 8, 1995.

Jacobs et al., "A Magnetic Pavement Marking and Sensor System for Lateral Control/Guidance of Vehicles", Proceedings of the Second World Congress on Intelligent Transport Systems, Yokohama, Japan, pp. 1236–1241, Nov. 8, 1995.

Isomoto et al., "Development of a Lane–Keeping System for Lane Deparature Avoidance", Proceedings of the Second World Congress on Intelligent Transport Systems, Yokohama, Japan, pp. 1266–1271, Nov. 8, 1995.

Nakamura et al., "Experimental Studies of Vehicle Lateral Control by Detection of Reflective Marker", Proceedings of the IVHS America Annual Meeting, pp. 592–596, 1993.

Yasui et al., "Lateral Control of Automobiles Using a Look–Ahead Sensor", Proceedings of the International Symposium on Advanced Vehicle Control, AVEC 92, Yokohama, Japan, pp. 293–296, 1992.

Zhang et al., "An Intelligent Roadway Reference System for Vehicle Lateral Guidance/Control", Proceedings of the American Control Conference, San Diego California, 1990.

*Primary Examiner*—Robert J. Oberleitner
*Assistant Examiner*—C. T. Bartz
*Attorney, Agent, or Firm*—John P. O'Banion

[57] ABSTRACT

An apparatus for automated vehicle lane-keeping in which a laser sensor is used to detect three points on a retroreflective paint stripe, and the three points are used to estimate the position of the lane centerline relative to the vehicle, as well as the geometry of the roadway. The position of the lane centerline and the curvature of the roadway are then used to determine a lateral error signal for feedback control, and the roadway curvature for feedforward control, both of which are combined to produce a steering control signal for the vehicle.

4 Claims, 7 Drawing Sheets

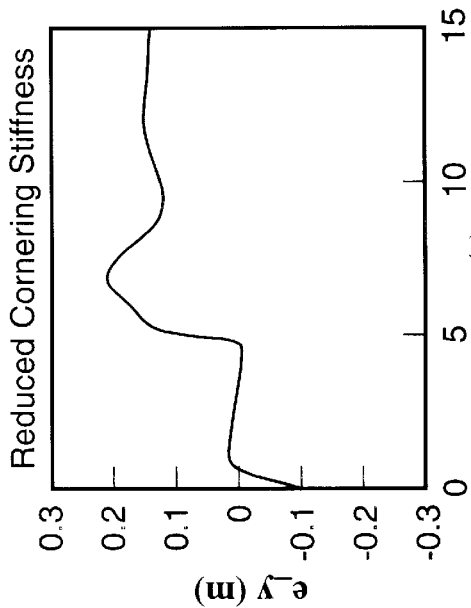
FIG. — 8A
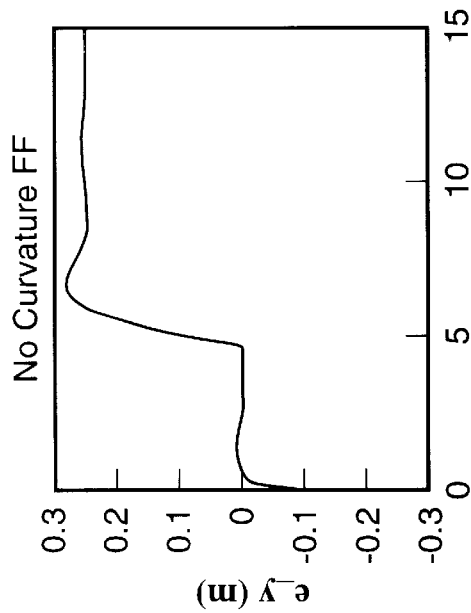
FIG. — 8C
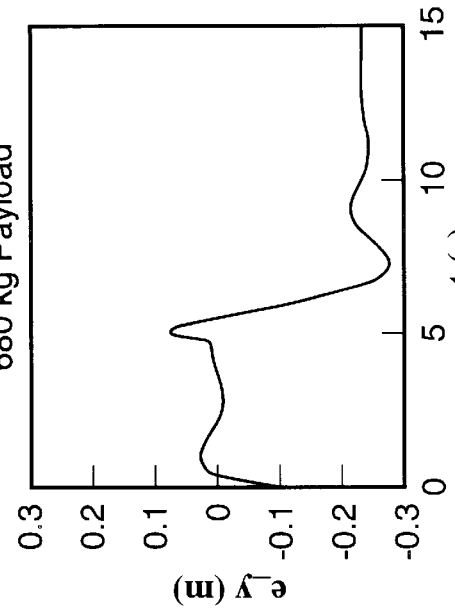
FIG. — 8B
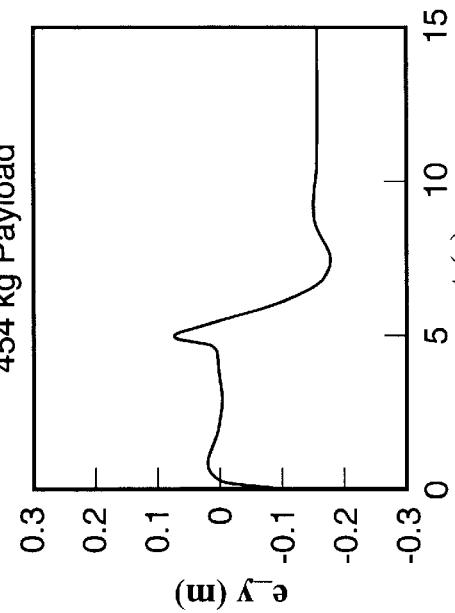
FIG. — 8D

LATERAL VEHICLE CONTROL APPARATUS AND METHOD FOR AUTOMATED HIGHWAY SYSTEMS AND INTELLIGENT CRUISE CONTROL

BACKGROUND OF THE INVENTION

1. Field of the Invention

The present invention pertains generally to Automated Highway Systems (AHS), and more particularly to a lateral vehicle control apparatus using a laser sensor which can be used for automated lane-keeping applications including automated lane-keeping in Intelligent Cruise Control (ICC) systems.

2. Description of the Background Art

Interest in Automated Highway Systems is strong in the United States, and interest in Advanced Vehicle Control systems (AVCS) for automobiles is high throughout the world. As a result, a number of technologies for automated vehicle control have emerged. Many of these technologies, however, rely on installation of a reference system which requires significant modification of the current highway infrastructure, thus making deployment of the AHS technologies more difficult than necessary. Therefore, there is a need for an alternative approach to the lateral control of automobiles which does not require specialized roadway reference markers and, therefore, is economical to install and maintain. The present invention satisfies those needs, as well as others, and overcomes deficiencies in previously developed AHS or AVCS technologies.

SUMMARY OF THE INVENTION

The present invention comprises an apparatus and method for autonomous lateral control of a highway vehicle which obviates the need for modification of the current roadway infrastructure by using an innovative laser sensor and control system which detects retroreflective paint stripes and determines the lateral error of the vehicle as well as the local geometry, i.e. curvature, of the roadway. Because the apparatus relies on markings that must be on the roadway for current lane delineation, minimal infrastructure support is required. The technology for painting lane delineation stripes is already in existence, and does not require the additional research and development necessary for deployment of additional discrete or continuous roadway reference markers such as required for previously developed technologies.

The present invention employs a known three-point scanning laser sensor which was developed to detect the position and geometry of retroreflective paint stripes on the roadway for automated paint restriping. A novel control methodology is combined with the sensor to determine the position of the paint stripe relative to the vehicle as well as the curvature of the paint stripe. This information is then used to provide for automatic lateral control of the vehicle.

In general terms, the present invention comprises a steering controller which uses the aforementioned laser sensor in a closed-loop system to maintain the vehicle in the center of a roadway lane. The controller generates a feedforward term based on the roadway curvature as estimated from the laser sensor, as well as a feedback component to minimize any residual error. Three sensed points on a retroreflective paint stripe are used to estimate the position of the lane centerline relative to the vehicle, as well as the curvature of the roadway. The position and geometry of the roadway are then used to determine a lateral error component for feedback, and the curvature estimate provides a feedforward steering angle term.

By way of example, and not of limitation, the scanning laser sensor is mounted on the vehicle to be controlled. The sensor produces three beams by splitting a single beam, and scanning motion is produced by directing the three beams to different facets of an octagonal mirror, so that the scanning beams sweep through a limited arc. Photosensors detect the retroreflected radiant flux, and provide the location of three points on the retroreflective paint stripe marking the lane relative to the moving vehicle's coordinate system. The sensor measures the retroreflected flux and determines the angular location of maximum retroreflectivity for each beam, which corresponds to the paint stripe location, and extracts the coordinates for the three points in the vehicle coordinate system.

The present invention then uses these three points to approximate the local geometry of the lane line with a circular arc. A curve fitting method is employed to provide the needed information to determine the lane curvature, along with the lane centerline which is the lane line curve offset by one-half of the lane width. This centerline curve then becomes the reference signal for the steering controller, providing the vehicle's lateral error as well as the local curvature of the roadway.

The three points from the sensor are used to fit either a straight line or a circular arc, as this represents the standard geometric entities found on the roadway. The resulting curve fit provides the position of the lane line at a preview distance in front of the vehicle, as well as a measurement of the roadway curvature. The curve representing the lane line is then offset to provide an estimate of the location of the lane centerline and the deviation of the vehicle from this location. This represents the lateral error of the vehicle, which is used for feedback to steer the vehicle to follow the lane centerline. The curvature information is also used to determine the feedforward term for the steering controller. By providing a steering term based on the estimated curvature of the roadway, the feedforward term significantly reduces the demands on the feedback computation, and allows a lower bandwidth to be used in the feedback portion of the control system. The preview component will provide the correct steering angle for nominal lane tracking assuming no lateral error and perfect system modeling and sensing, and the feedback component will remove any residual error.

Therefore, the present invention provides for autonomous lateral vehicle control with minimal infrastructure support. Since the invention relies only on the presence of paint stripes for lane delineation, it can be used on many existing highways with little or no infrastructure modification. Furthermore, the invention is functional with old paint stripes that have degraded to 40% to 60% of their original retroreflectivity. It can therefore provide the lane-keeping function for an Intelligent Cruise Control system.

The invention can also be used for driver assistance in transit and maintenance operations, for driver support in general driving, or as part of a complete AHS. Such a system with low infrastructure reliance will also be valuable as a lateral reference system during the envisioned retrofit operation of the current highway system to develop a future AHS, as well as for verifying the accuracy and function of any installed AHS reference system.

An object of the invention is to provide for automated lane-keeping of vehicles on a roadway.

Another object of the invention is to provide for the lane-keeping function for an Intelligent Cruse Control system (Adaptive Cruise Control).

Another object of the invention is to provide for automated lane-keeping without modifying the roadway infrastructure.

Another object of the invention is to provide for automated lane-keeping using existing retroreflective paint stripes.

Another object of the invention is to provide for automated lane-keeping using existing sensor technology used for automated paint restriping.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 8A through FIG. 8D are graphs showing lateral error simulations with no curvature feedforward component, with cornering stiffness reduced by 50%, for a payload of 454 kg, and for a payload of 680 kg, respectively.

DESCRIPTION OF THE PREFERRED EMBODIMENTS

Figure 1:
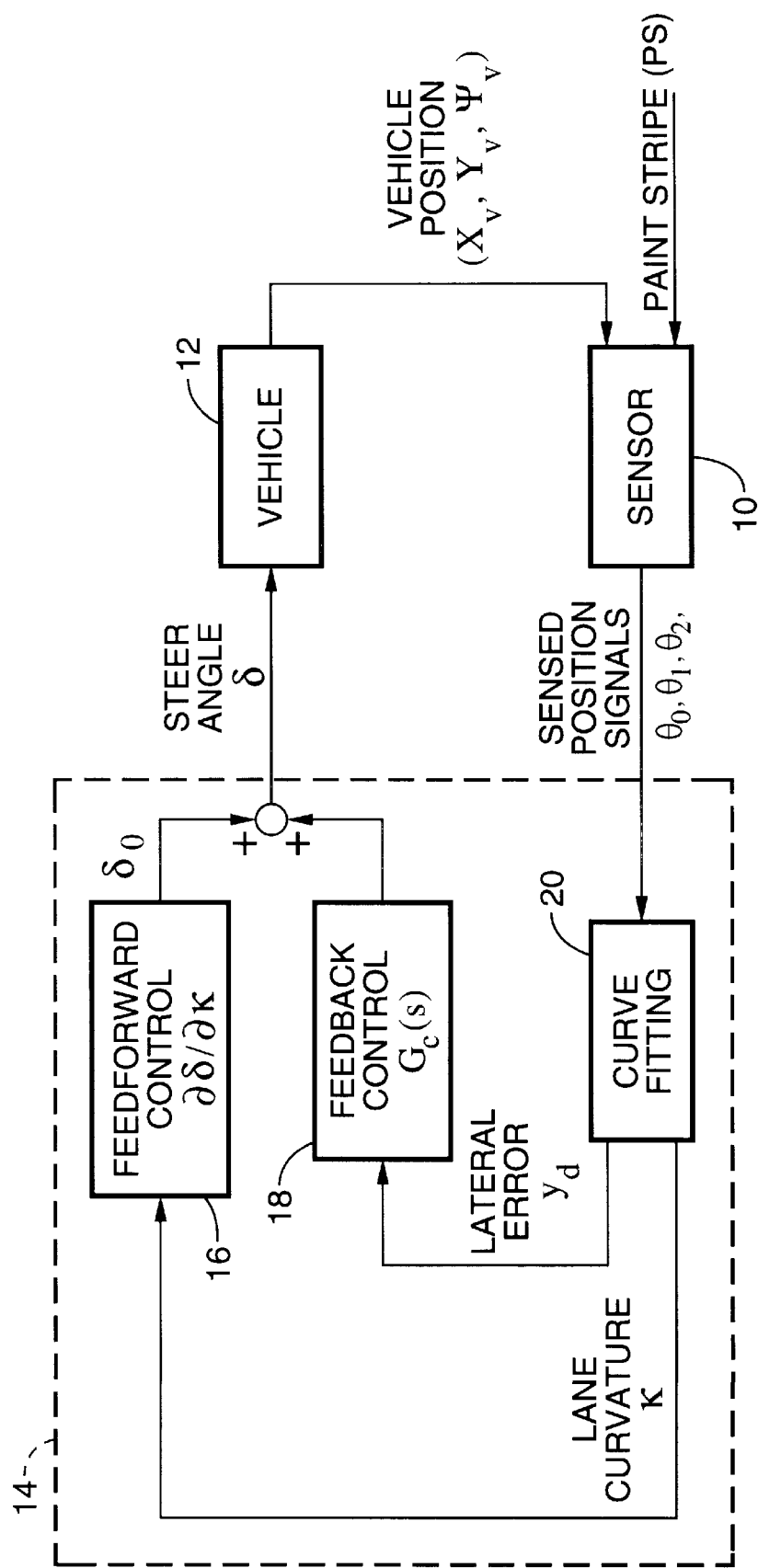
FIG. 1 is a functional block diagram of an automated lane-keeping system in accordance with the present invention.

For illustrative purposes, the present invention will be described with reference to FIG. 1 through FIG. 8, where like reference numerals denote like parts. It will be appreciated that the apparatus may vary as to configuration and as to details of the parts, and that the method may vary as to the steps and their sequence, without departing from the basic concepts as disclosed herein.

Referring first to FIG. 1, a functional block diagram of an automated lane-keeping system employing the present invention is shown. The system comprises a laser sensor 10 mounted on a vehicle 12, and a steering controller 14. The steering controller comprises a feedforward control module 16, a feedback control module 18, and a curve fitting module 20. It will be appreciated from the discussion herein that the steering controller and each of the modules included therein would typically be implemented in software on a computer, but hardware and/or firmware implementations are also contemplated.

Sensor 10 is a conventional single beam sensor for painting retroreflective paint stripes available from Advanced Retro Technology, Inc. (ARTI) of Spring Valley, Calif., that has been modified in a conventional manner to produce three scanning beams from the single beam using an octagonal rotating mirror and associated beam splitting optics. An example of such a modified laser sensor suitable for use in the present invention is described in the open literature by J. Rennilson and J. Yu in the ARTI report entitled "Automated Paint Restriping Recognition and Guidance System: Phase I Final Report", Technical Report UCD-ARR-91-11-01-01, Advanced Highway Maintenance and Construction Technology (AHMCT) Research Center, University of California, Davis, November 1991, which is incorporated by reference herein. The sensor was originally developed for measurement of retroreflectivity of paint stripes to determine when the stripes required repainting, and previous tests show that the sensor can detect old paint stripes that have degraded to 40% to 50% of their original reflectivity. However, the sensor can also be used in the present invention as discussed below.

Figure 2:
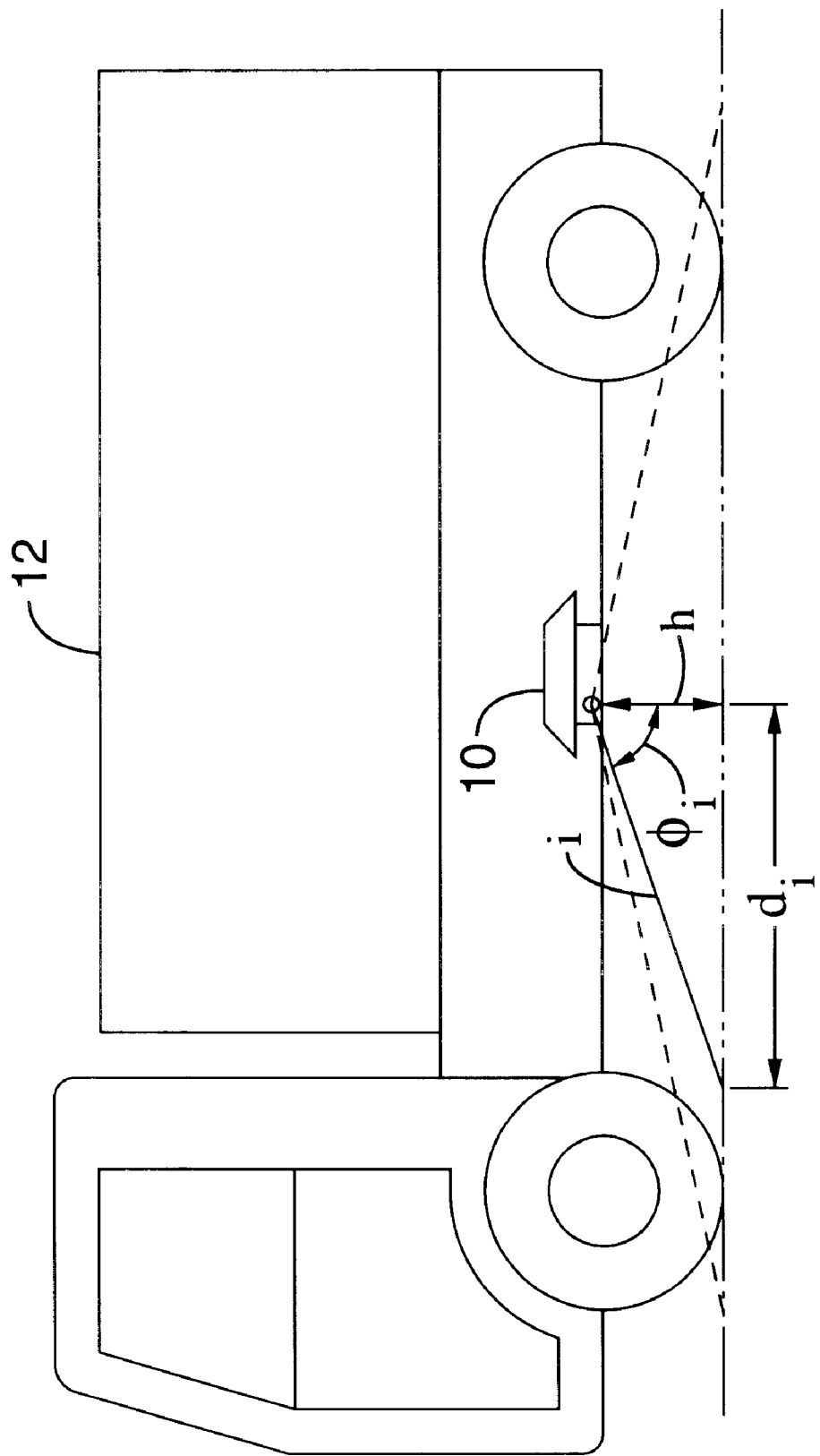
FIG. 2 is a diagrammatic view in side elevation of a vehicle on which a sensor in accordance with the present invention is mounted, showing the geometry of the scanning beams in relation to the roadway surface.
Figure 3:
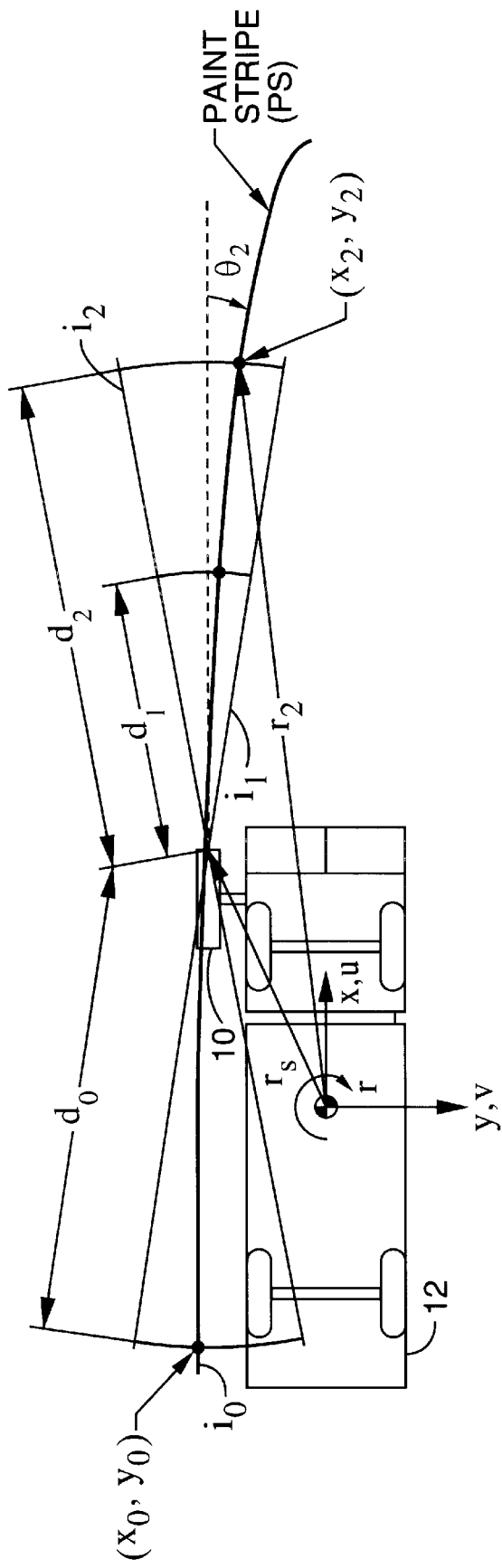
FIG. 3 is a top plan diagrammatic view of a vehicle on which a sensor in accordance with the present invention is mounted, showing the geometric relationship between the vehicle, the roadway, the lane centerline, the retroreflective paint stripe, the three scanning beams, the motion characteristics of the vehicle, and the positional guidance parameters of the present invention.

Referring to FIG. 2, it will be appreciated that for a given sensor mounting height h and vertical beam angles $\phi_i$ produced by the prisms, each laser beam i, i=0, 1, 2, will have fixed horizontal scanning radius $d_i$=h tan $\phi_i$ at ground level, assuming negligible pitch and bounce of the vehicle. Referring also to FIG. 3, each beam is swept through a fixed arc by an octagonal scanning mirror, and the retroreflected radiant flux is detected by the sensor. For each beam, the central location of the paint stripe PS is found, and the resulting angular location of the beam, $\theta_i$ is determined. From the known radius $d_i$ and sensed angle $\theta_i$, the location of the $i^{th}$ beam's detection of the lane stripe (paint stripe) relative to the vehicle's center of gravity (CG) frame is determined by $$\vec{r}_i = x_i\hat{i} + y_i\hat{j} = (d_i \cos \theta_i + x_s)\hat{i} + (d_i \sin \theta_i + y_s)\hat{j} \qquad (1)$$

where $\vec{r}_s = x_s\hat{i} + y_s\hat{j}$ is the origin of the laser sensing system relative to the vehicle CG. Note from FIG. 3 that the first beam $i_0$ is directed opposite the vehicle motion, so that $d_0 < 0$. This provides a longer baseline for sensing the local geometry of the paint stripe, while allowing a better geometry for the laser beam vertical angles. This issue is important if vehicle pitch and bounce are significant.

Figure 4:
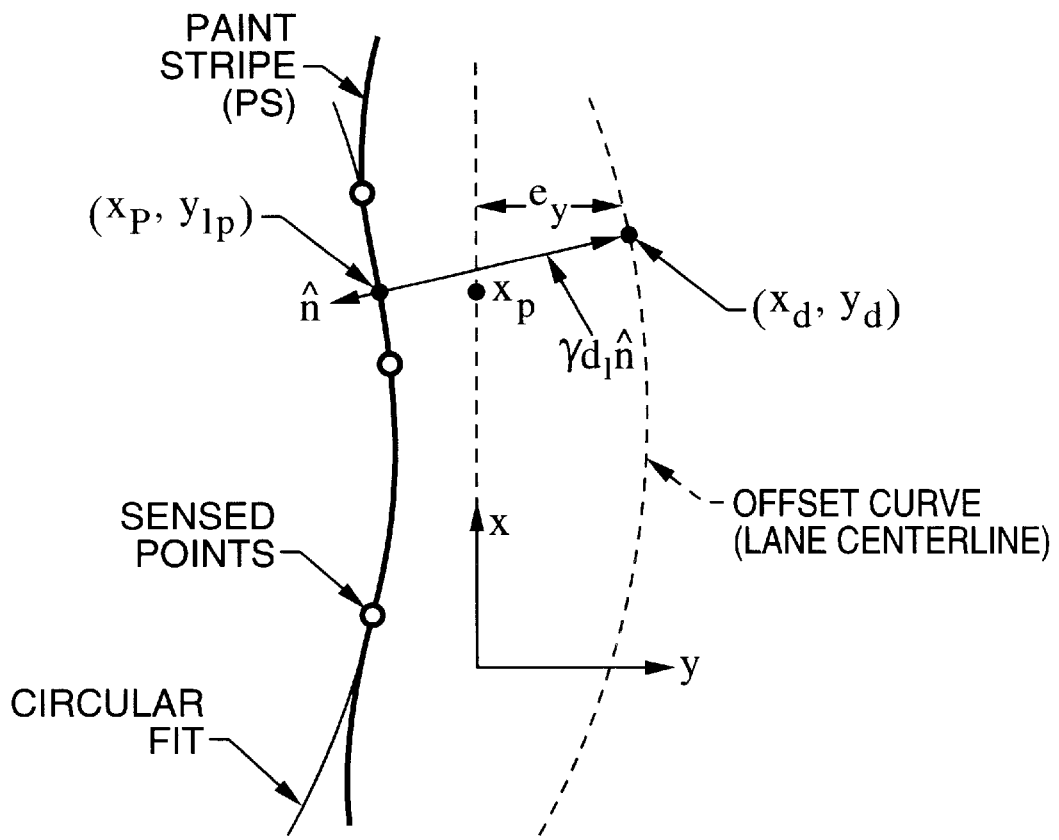
FIG. 4 is a schematic diagram showing the curve fit geometry of the present invention.

Assuming that the three sensed points are non-collinear, they define a circular arc. The geometry of this curve fit is illustrated in FIG. 4. Defining vectors $\vec{r}_{01} = \vec{r}_1 - \vec{r}_0$ and $\vec{r}_{02} = \vec{r}_2 - \vec{r}_0$, and denoting the vector from the origin of the vehicle CG frame to the center of the circle as $\vec{r}_c$, then the vector from the center of the circle to the first sensed point is given by $\vec{r}_{c0} = \vec{r}_0 - \vec{r}_c$ and using notation $|\vec{r}| = r$, $$\vec{r}_{c0} = \frac{r_{02}^2(r_{01}^2 - \vec{r}_{01} \cdot \vec{r}_{02})\vec{r}_{01} - r_{01}^2(r_{02}^2 - \vec{r}_{01} \cdot \vec{r}_{02})\vec{r}_{02}}{2|\vec{r}_{01} \times \vec{r}_{02}|^2} \qquad (2)$$

so that $$\vec{r}_c = \vec{r}_0 - \vec{r}_{c0} = x_c\hat{i} + y_c\hat{j} \qquad (3)$$

In the region of interest near the sensed points, the circular fit yields a function for the lane stripe fit given by $$y_l = f_l(x) = \pm \sqrt{R^2 - (x - x_c)^2} + y_c \quad (4)$$

where $R \equiv |\vec{r}_{co}|$ and the sign for the square root is selected to yield the smaller magnitude.

The controller uses the lane stripe information at a fixed preview distance ahead of the vehicle, denoted by $x_p$. The location for the stripe at this distance is given by $\vec{r}_{lp} = x_p \hat{i} + y_{lp} \hat{j}$, with $y_{lp} = f_l''(x_p)$. The principal normal vector at the this point is given by $$\hat{n} = \frac{\vec{r}_c - \vec{r}_{lp}}{R}. \quad (5)$$

The desired position of the preview point of the vehicle is given by the offset curve of the paint stripe, $$\vec{r}_d = \vec{r}_{lp} + \gamma d_l \hat{n} = x_d \hat{i} + y_d \hat{j} \quad (6)$$

which represents a point on the lane centerline, with $d_l$ being half the width of the lane. Here, $\gamma = -\text{sgn}(f_l''(x_p))$ with $$\left( f_l''(x_p) = \frac{d^2 f}{d x^2} \right)_{x = x_p}.$$

Therefore, if the sensor is mounted on the left side of the vehicle as shown in FIG. 2 and FIG. 3, $\gamma$ will be +1 for a left turn and −1 for a right turn. The signs will be opposite if the sensor is mounted on the right side of the vehicle. The total error vector for the preview point is given by $$\vec{e}_p = \vec{r}_d - (x_p \hat{i} + y_p \hat{j}) = e_x \hat{i} + e_y \hat{j} \quad (7)$$

where $y_p = 0$. In the present invention, only the lateral portion of this error signal will be used, so that the error signal is given by $e_y = y_d - y_p = y_d$. The radius of curvature of the centerline is given by $\rho = R + \gamma d_l$, so that the curvature is $$\kappa = \frac{1}{\rho} = \frac{1}{R + \gamma d_l}. \quad (8)$$

In the degenerate case where the sensed points are collinear, $\vec{r}_{01} \times \vec{r}_{02} = 0$, and the points are fit with a straight line with $\kappa = 0$, and a positive offset is used to determine the lane centerline position with the sensor mounted on the left side of the vehicle. If the sensor is mounted on the right side of the vehicle, a negative offset would be used. Thus, the laser sensor provides a relative measure of the lane centerline position and geometry, from which lateral position error and lane curvature can be determined and used for lateral vehicle control. The geometry of the curve fit and its offset is shown in FIG. 4.

The vehicle dynamic model used for the control design and subsequent simulation is the well-known simple "bicycle" model with a linear non-dynamic tire model. This model is sufficient to capture the most relevant vehicle dynamics for the present invention, which demonstrates the feasibility of the application of the three-point laser sensor to vehicle lateral control. It is also contemplated that a higher order model including vehicle roll and a more complex tire model can be used for simulation. Since the details of the simple bicycle model are well known to those skilled in the art, the model will only be briefly reviewed here.

Figure 5:
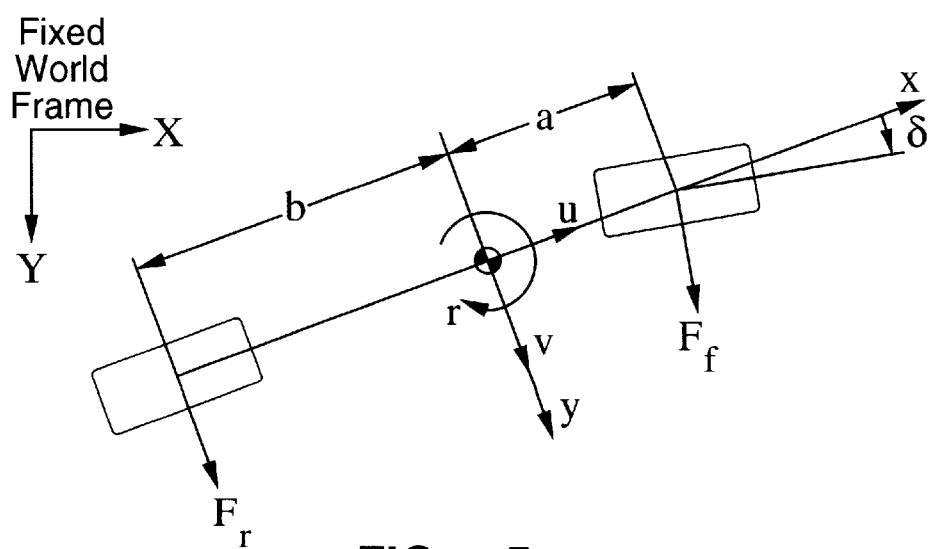
FIG. 5 is a schematic diagram of the bicycle vehicle dynamic model employed in the present invention.

Using the "world coordinate frame" coordinates $X_v$, $Y_v$, $\Psi_v$ to denote vehicle position, where $X_v$, $Y_v$ provide the position of the vehicle CG and $\Psi_v$ provides the yaw (heading) angle between the vehicle x-axis and the world X-axis, the coordinate frame and variable assignments are shown in FIG. 5 from which the dynamic equations can be written as $$\Sigma F_y = m a_y = m(\dot{v} + ur) = 2C_f \alpha_f + 2C_r \alpha_r \quad (9)$$

$$\Sigma M_z = I_z \dot{\omega}_z = I_z \dot{r} = 2aC_f \alpha_f - 2bC_r \alpha_r \quad (10)$$

where $F_y$ represents the forces produced by the vehicle tires in the lateral direction (y-axis), $M_z$ represents the moments produced by the tire forces about the vertical z-axis, $\alpha_f$ and $\alpha_r$ are the front and rear tire slip angles, respectively, $C_f$ and $C_r$ are the front and rear tire cornering stiffness, respectively, $\omega_z = r$ is the vehicle yaw rate about the z-axis, u is the constant longitudinal (forward) velocity of the vehicle, $C_f$ and $C_r$ are the front and rear tire cornering stiffness, respectively, a and b are the distances from the vehicle center of gravity (CG) to the front and rear axles, respectively, m is the vehicle mass, $I_z$ is the vehicle yaw inertia, $a_y$ is the lateral acceleration of the vehicle, and v is the lateral velocity. The factor of two in each term is included since the cornering stiffness is defined for each physical tire, while the bicycle model treats the front pair of tires as a single tire and the rear pair of tires as a single tire.

Assuming small slip and steering angles, $$\alpha_f \approx \delta - \frac{v + ar}{u}, \alpha_r \approx -\frac{v - br}{u} \quad (11)$$

where r is the yaw rate, and $\delta$ is the input steering angle. With this, the equations of motion can be written as $$m(\dot{v} + ur) = 2C_f \left( \delta - \frac{v + ar}{u} \right) + 2C_r \left( -\frac{v - br}{u} \right) \quad (12)$$

$$I_z \dot{r} = 2aC_f \left( \delta - \frac{v + ar}{u} \right) - 2bC_r \left( -\frac{v - br}{u} \right) \quad (13)$$

or, in state-space form, with state vector $\vec{\xi} = [v, r]'$, $$\dot{\vec{\xi}} = \overline{A} \vec{\xi} + \vec{b} \delta \quad (14)$$

where $$\overline{A} = \begin{bmatrix} -2\frac{(C_f + C_r)}{mu} & \frac{2(bC_r - aC_f)}{mu} - u \\ \frac{2(bC_r - aC_f)}{I_z u} & -\frac{2(b^2 C_r + a^2 C_f)}{I_z u} \end{bmatrix} \quad (15)$$

$$\vec{b} = \begin{bmatrix} \frac{2C_f}{m} \\ \frac{2aC_f}{I_z} \end{bmatrix} \quad (16)$$

Note that the state-space equations in the body-fixed CG frame are linear, as long as the vehicle forward velocity u is constant and is left out of the vehicle state.

For control purposes, the output is defined as the lateral velocity of the preview point $\vec{r}_p = x_p \hat{i}$ given by $$T = \dot{y}_p = v + r x_p \quad (17)$$

so that the output equation is given by $$T = \vec{C}\vec{\xi} + d\delta \quad (18)$$

with $\vec{C} = [1 \; x_p]$ and $d=0$. For the vehicle parameters for a Ford F-250 maintenance vehicle discussed in Example 1 below, combined with a sensor preview distance of 15 m, this yields a transfer function at the design speed of u=30 m/s (67 MPH) given by $$P(s) \equiv \frac{T(s)}{\delta(s)} = \frac{250(s + 0.61)}{s^2 + 4s + 8.82} \quad (19)$$

where s is the standard complex variable used in the Laplace transform with s≡σ+jω where σ and ω are real numbers and j=$\sqrt{-1}$.

This body-fixed state-space dynamic model and the associated transfer function for the given operating speed form the core of the vehicle model for design and simulation. It is also contemplated that a more detailed model including an enhanced tire model could be developed for simulation. However, this current model appears to be sufficient based on the general understanding that the bicycle model is valid for lateral acceleration up to about 0.3 g, and that for normal vehicle operation this is more than acceptable since greater lateral acceleration leads to an uncomfortable ride. This limit on the lateral acceleration provides one check on the validity of simulations using this model. In addition, the use of the non-dynamic tire model assumed here is valid up to a slip angle of about 4.0 degrees.

Referring again to FIG. 1, feedforward controller 16 produces a preview component $\delta_o$ as a feedforward steering term based on the estimated curvature κ of the roadway from curve fitting module 20. $G_c(s)$ is a lateral error compensator embodied in feedback control module 18. The feedforward and feedback terms combine to produce a control signal for the desired front steering angle δ, which is sent to a steering actuator (not shown) on the vehicle.

The preview component will provide the correct steering angle for nominal lane tracking assuming no lateral error and perfect system modeling and lane sensing. This preview component is given by $$\delta_o = \frac{\partial \delta}{\partial \kappa} \kappa = \left( l + \frac{m(bC_r - aC_f)u^2}{2lC_rC_f} \right) \kappa \quad (20)$$

although $\delta_o \approx l\kappa$ alone will provide a good approximation that does not require knowledge of the vehicle and tire parameters.

EXAMPLE 1

The compensator $G_c(s)$ was designed using well-known loop shaping for a nominal operating speed of u=30 m/s (67 MPH) and nominal vehicle parameters for a Ford F-250 truck. The bicycle model formed the basis for the design of the compensator, and the compensator used in the simulation was $$G_c(s) = \frac{K_p(s + 2)}{s + 20} \quad (21)$$

with $K_p$=0.5 rad/m. It will be appreciated that the selection of $G_c(s)$ depends upon the vehicle parameters as well as the operating speed. In the current system, gain-scheduling can be implemented based on the operating speed. The laser sensor, controller, and vehicle dynamic model presented here have been simulated using MATLAB® and SIMULINK®, both of which are products available from TheMathWorks, Inc. The pertinent parameters for the Ford F-250 truck used in the simulation are given in Table 1.

TABLE 1

| $C_f$,r (N/rad) | m (kg) | $I_z$ (kg · m$^2$) | a (m) | b (m) |
|---|---|---|---|---|
| 40,000 | 2610 | 7940 | 1.45 | 1.94 |

The sensor preview distance is selected as $x_p$=15 m. The section of roadway simulated is given by a straight section for the first five seconds, followed by a right-turn curve with radius ρ=600 m, which is just below minimum radius for this design speed according to American Association of State Highway and Transportation Officials (AASHTO) policy.

Figure 6B:
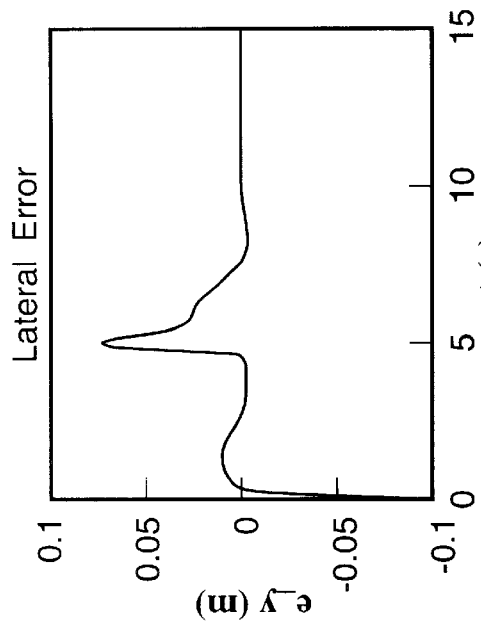
FIG. 6A through FIG. 6D are graphs showing the vehicle trajectory, lateral error, lateral acceleration, and steering input, respectively, for a baseline simulation of the present invention.
Figure 6D:
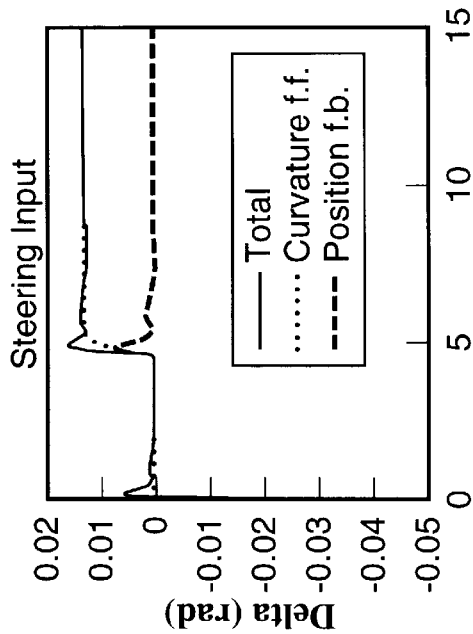
Figure 6A:
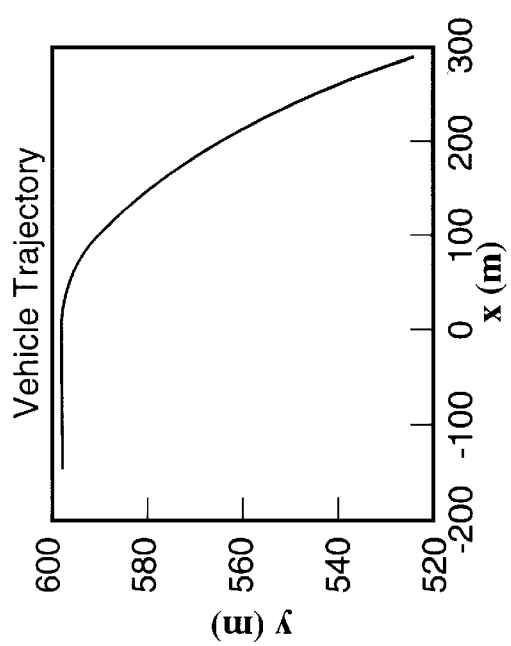
Figure 6C:
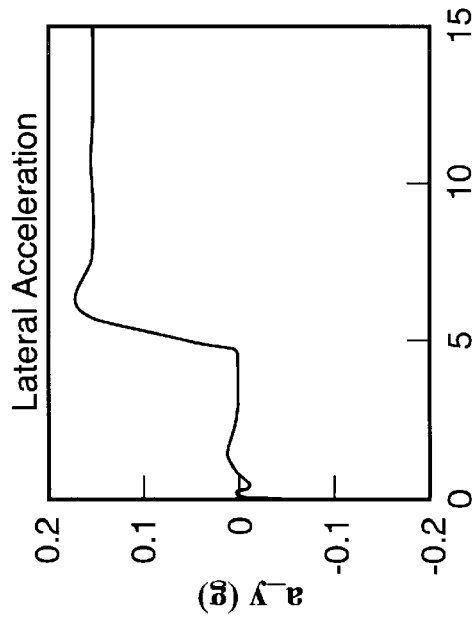

The first simulation represents a baseline for comparison. In this simulation, the vehicle travels at the design speed of u=30 m/s, and all dynamic parameters are exact. The resulting trajectory, lateral error, lateral acceleration, and steering input are shown in FIG. 6A through FIG. 6D, respectively. The initial lateral error is 0.1 m as the vehicle is moving along the straight segment of the roadway. The maximum lateral error as the vehicle enters the curve is about 7 cm. The maximum magnitude of the lateral velocity is about 0.6 m/s, which represents a vehicle slip angle of about 1.1 degrees. This is significant, as the simple linear tire model selected for the current simulation is valid up to about 4.0 degrees of slip. The maximum lateral acceleration is about 0.17 g, which is well within the accepted human comfort level of 0.3 g. The steering angle components for curvature feedforward (dotted line) and position feedback (dashed line) are shown in FIG. 6D. Clearly, the use of curvature information significantly reduces the required feedback controller bandwidth; this is one major justification for the use of three beams in the laser sensor to extract curvature.

Figure 7B:
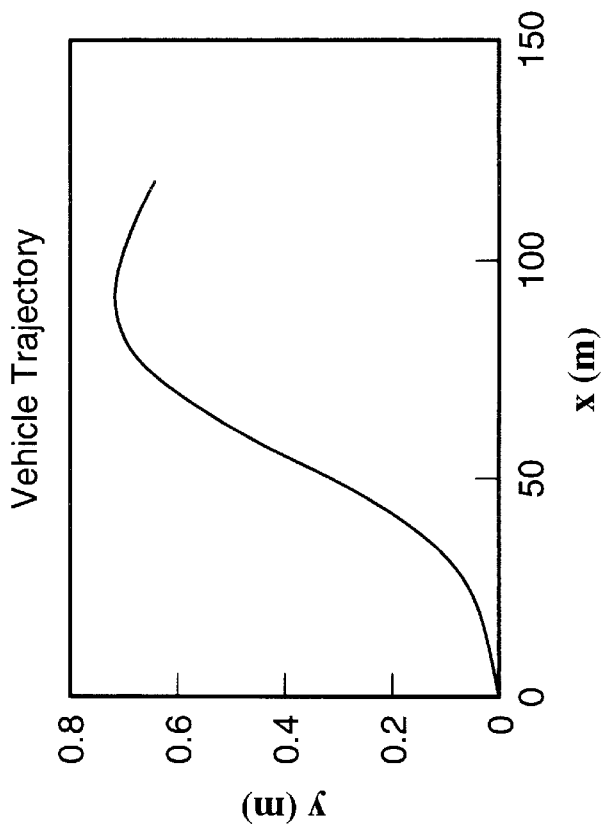
FIG. 7A through FIG. 7B are graphs showing lateral error and vehicle trajectory, respectively, based on field tests of the sensor employed in the present invention.
Figure 7A:
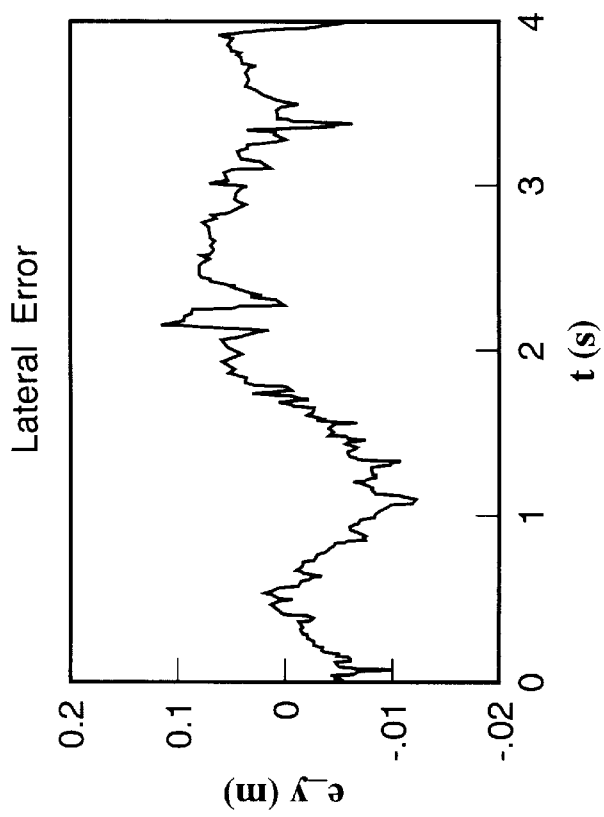

Sample test data for the sensor collected under highway driving conditions is shown in FIG. 7. This data represents the lane centerline position relative to the vehicle as detected from the paint stripe position. This sample data has been used in the simulation to determine the response of the controller and vehicle model to actual sensor data. Here, the vehicle is located initially at the origin of the inertial (fixed world coordinate) frame, with zero heading angle and forward velocity of u=30 m/s. The actual error signal collected using the laser sensor is the input into the compensator $G_c(s)$. The error signal and the resulting simulated vehicle trajectory are shown in FIG. 7A and FIG. 7B, respectively. Note that this simulation is essentially open-loop, as the error signal is not changed by the simulated motion of the vehicle, and no curvature data is available. Here, the vehicle is simply being steered based on the output of the feedback compensator using the previously measured error data as input. However, the result demonstrates the feasibility of the use of the real sensor in such a control system.

An additional simulation was performed with no curvature feedforward information, i.e. $\partial\delta/\partial\kappa$=0. Here, the lateral error through the curve reaches a steady-state value of about 25.4 cm, which is considerably higher than the maximum of 7.0 cm obtained with the use of curvature data. In addition, the controller using the sensed curvature for feedforward control converges to nearly zero error while tracking the curve. This again illustrates the importance of the curvature sensing ability of the present invention. Other simulations have been performed to investigate the robustness of the current control system to variations in cornering stiffness and payload variations. For such variations, the dynamic behavior of the vehicle will change, as will the needed preview steering angle based on curvature. These changes are not accounted for in either the feedforward or feedback portions of the current controller, and the performance is degraded as a result. The results for a 50% reduction in the cornering stiffness are poor, yet still safe. Simulations for payloads of 454 kg and 680 kg (1000 lb and 1500 lb) also yield degraded results. The lateral error for each of these simulations is shown in FIG. 8A through FIG. 8D. A significant factor in the response for the payload and reduced cornering stiffness simulations is the incorrect value of $\partial\delta/\partial\kappa$ used in the curvature feedforward. In each of these simulations, the nominal (no payload, nominal cornering stiffness) parameters are used to determine $\partial\delta/\partial\kappa$. The nominal value for $\partial\delta/\partial\kappa$ is 7.6 m-rad, while the true $\partial\delta/\partial\kappa$ is 11.8, 2.9, and 0.5 m-rad in the simulations shown in FIG. 8B, C, and D, respectively.

It will be appreciated, therefore, that the feedback compensator $G_c(s)$ described above is not necessarily robust to parameter variations such as payload and cornering stiffness. Accordingly, it may be desirable to modify the design of the feedback compensator $G_c(s)$ to provide improved robustness over a wide range of typical variations in dynamic parameters such as speed, payload and cornering stiffness. The compensator can be simultaneously be modified to yield reduced sensitivity to external disturbances, such as lateral wind gusts.

For example, using Quantitative Feedback Theory (QFT) a compensator can be developed which provides robust stability over the entire range of uncertainty with a 30° phase margin as well as plant input disturbance rejection. It will be appreciated that other phase margins could be used as design parameters and that as payload changes, so will m, $I_z$ and the location of the center of gravity. Referring again to the Ford F-250 truck for which a typical range of parameters are shown in Table 2, the compensator $G_c(s)$, designed using an interactive loop shaping design environment, is selected as $$G_c(s) = \frac{0.0267(1+s)(1+s/0.75)(1+2s)}{s(1+2(0.7)s/70+s^2/4900)}. \quad (22)$$

TABLE 2

| Nominal Vehicle Parameters | | | | Varying Parameters | | |
|---|---|---|---|---|---|---|
| m | $I_z$ | a | b | $m_p$ | $C_s$ | u |
| 2613 kg | 7944 kg-m² | 1.45m | 1.94m | [0, 454] kg | [32, 40] kN/rad | [20, 30] m/s |
| 5760 lbm | 5860 ft-lb-s² | 4.76 ft | 6.35 ft | [0, 1000] lbm | [7.2,9.0] klb/rad | [45, 65] mph |

Here, the integrator is provided to achieve zero steady-state error for tracking of a fixed-radius curve. A more optimal design may be possible, but at the cost of greater compensator complexity. The explicit ability to address tradeoffs in performance specifications, acceptable plant uncertainty, and inherent costs of feedback is one of the key benefits of QFT design. Additional background information on the use of QFT in this manner can be found in T. A. Lasky and B. Ravani, "Robust Lateral Vehicle Control using Quantitative Feedback Theory (QFT)," Proceedings of the Third World Congress on Intelligent Transportation Systems (ITS), Orlando, Fla., October 1996, which is incorporated by reference herein. Note, however, that while QFT can be used as described above to provide for robust control with plant (vehicle) input disturbance rejection and other plant parameter variation, other techniques such as Variable Structure Control, Adaptive Control, $H^\infty$ Robust Control, and the like can be used as well.

EXAMPLE 2

The closed-loop control system shown in FIG. 1 using the compensator $G_c(s)$ given in Equation 22 has been simulated for eight plants generated by the selected model subject to the various uncertainty cases, i.e. by the grid of the minimum and maximum values of the payload, cornering stiffness, and vehicle speed. Here, the feedforward term was eliminated and the curvature treated as disturbance. The simulation begins with zero lateral offset and zero roadway curvature. The curvature varies as a function of time in the form of a clotoid curve, i.e. the curvature varies linearly in t∈[0, 2] seconds at nominal velocity u=30 m/s, from the initial value of κ=0 to the final maximum κ=(1/600)(m⁻¹). The road then remains at this constant value of curvature for the remainder of the simulation. The results indicate that the compensator indeed achieves robust stability and the desired plant input disturbance rejection specifications. The lateral deviation of the vehicle was maintained at below 0.1 m, and the compensator achieved a stable response even for the cases in which the plant itself is highly underdamped. The benefits of QFT are seen in reduced oscillation and energy inherent in the control signal generated by the compensator. Particularly for plant cases that are underdamped, the QFT controller achieves the desired performance specifications while significantly reducing the actuator power relative to a standard Proportional-Integral-Derivative (PID) controller.

Note also that the foregoing modified compensator design using QFT can be used in conjunction with the feedforward curvature controller to provide lateral control that is robust to external disturbances and vehicle parameter variation.

Accordingly, the present invention provides autonomous lateral vehicle control which requires minimal infrastructure support. Since this sensor only relies on the presence of retroreflective paint stripes for lane delineation, it can be used on many existing highways with little or no infrastructure modification. The invention can be used for driver assistance in transit and maintenance operations, for driver support in general driving, or as part of a complete AHS. Such a system with low infrastructure reliance will also be valuable as a lateral reference system during envisioned retrofit operations of the current highway system to develop a future AHS, as well as for verifying the accuracy and function of any installed AHS reference system. The system can also provide the lane-keeping function of an Intelligent Cruise Control system.

Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed:

1. A method for guiding a vehicle along a roadway, comprising:
    (a) sensing the position of a retroreflective paint stripe on the surface of a roadway in relation to a moving vehicle;
    (b) the lateral position differential between said vehicle in relation to said paint stripe at a preview distance ahead of said vehicle in the direction of travel of said vehicle and a desired position; and (c) producing a steering control signal for a vehicle based on said estimated lateral position differential.

2. A method as recited in claim 1, further comprising the steps of:

(d) estimating curvature of said paint stripe from said sensed position at a preview distance from said vehicle in the direction of travel of said vehicle;

(e) producing a feedforward signal based on said estimated curvature of said paint stripe;

(f) producing a feedback signal based on said lateral differential in position; and (g) combining said feedforward signal and said feedback signal to produce said steering control signal.

3. A method for guiding a vehicle along a roadway, comprising:

(a) sensing the position of a retroreflective paint stripe on the surface of a roadway in relation to a moving vehicle, said paint stripe delineating a lane in said roadway, said lane having a centerline;

(b) estimating the lateral position differential between a point at a preview distance in front of said vehicle and the centerline of said lane; and (c) estimating curvature of said paint stripe from said sensed position;

(d) producing a feedforward signal based on said estimated curvature of said paint stripe;

(e) producing a feedback signal based on said estimated lateral differential in position; and (f) combining said feedforward signal and said feedback signal to produce a steering control signal.

4. A method for guiding a vehicle along a roadway, comprising:

(a) sensing retroreflectivity of a paint stripe on a roadway surface using a three-point laser sensor and producing a position signal indicative of the relative position between said sensor and said paint stripe, said paint stripe delineating a lane on said roadway, said lane having a centerline;

(b) estimating lane curvature from said position signal;

(c) estimating the lateral differential in position between a point at a preview distance in front of said vehicle and the centerline of said lane;

(d) producing a feedforward signal based on said estimated lane curvature;

(e) producing a feedback signal based on said estimated lateral differential in position; and (f) combining said feedforward signal and said feedback signal to produce a steering control signal.

* * * * *